2 Sheets—Sheet 1.
A. H. FESSENDEN.
Horse-Power Corn-Planter.
No. 210,845. Patented Dec. 17, 1878.
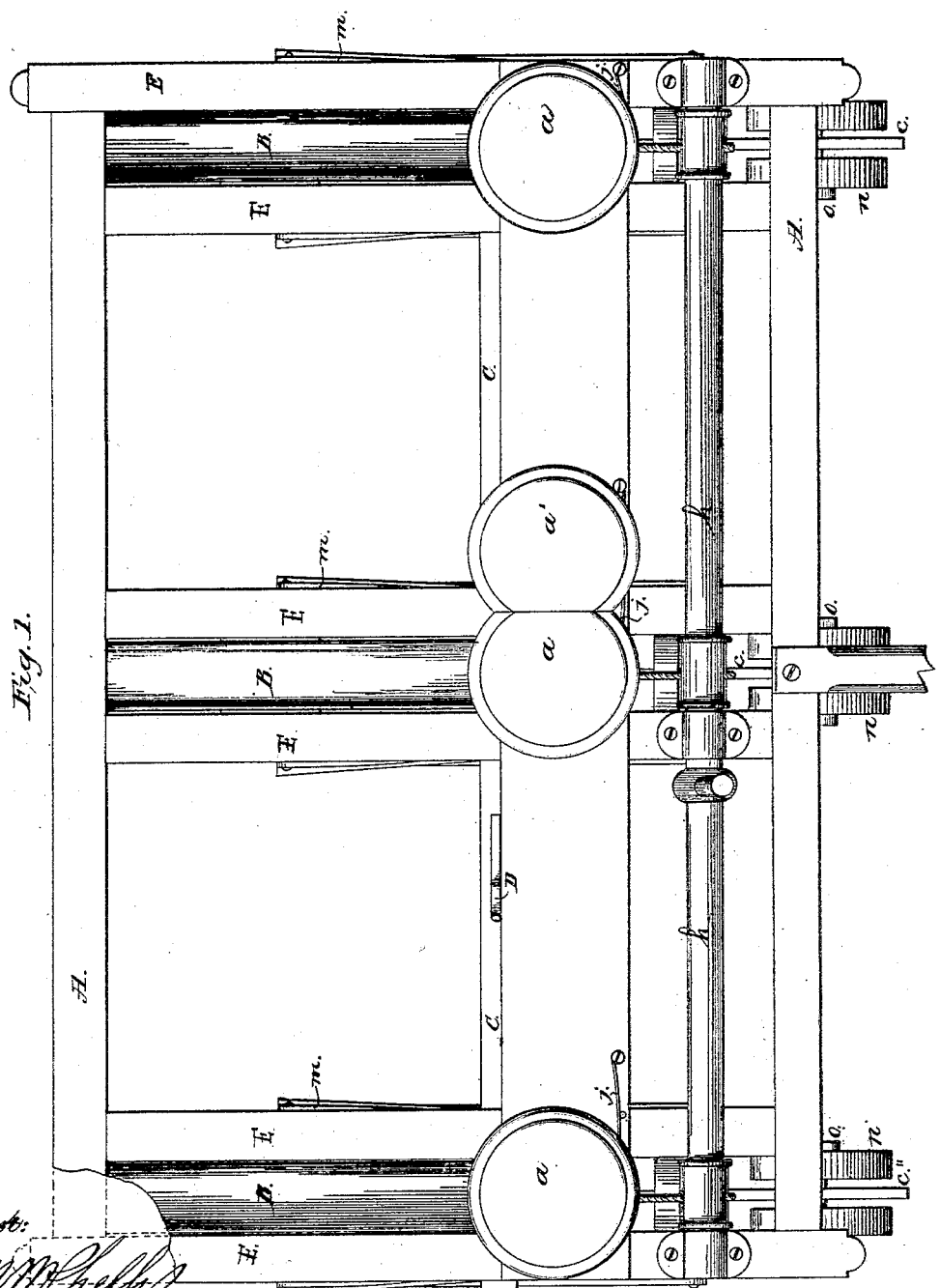

2 Sheets—Sheet 2.
A. H. FESSENDEN.
Horse-Power Corn-Planter.
No. 210,845. Patented Dec. 17, 1878.
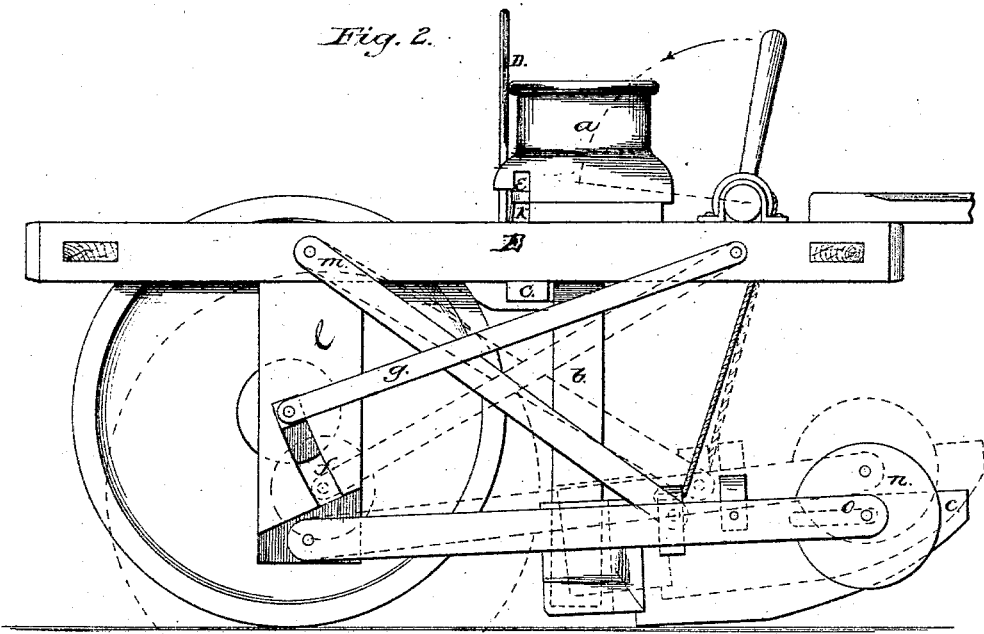
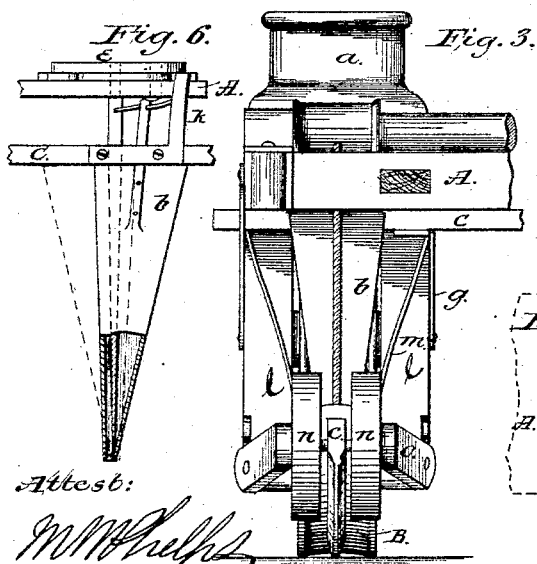
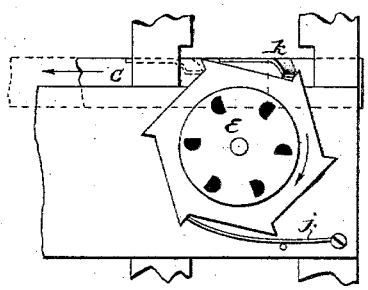
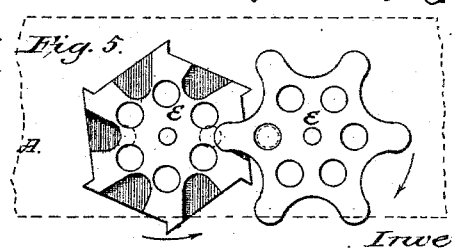
Attest:  
Inventor:  
Albert H. Fessenden

UNITED STATES PATENT OFFICE.

ALBERT H. FESSENDEN, OF PORTER, ASSIGNOR OF ONE-HALF HIS RIGHT TO ADELBERT W. FESSENDEN, OF JANESVILLE, WISCONSIN.

IMPROVEMENT IN HORSE-POWER CORN-PLANTERS.

Specification forming part of Letters Patent No. 210,845, dated December 17, 1878; application filed March 23, 1876.

*To all whom it may concern:*

Be it known that I, ALBERT H. FESSENDEN, of Porter, in the county of Rock and State of Wisconsin, have invented a new and useful Improvement in Horse-Power Corn-Planters, which improvement is fully set forth in the following specification, reference being had to the accompanying drawings.

This invention relates to that class of corn-planters which work by horse-power. It has three wheels, and plants three rows at one passage, having a frame upon which the driver and operator is to ride, who, by means of a lever, opens and closes the dropper at the proper time.

The object of my invention is to accomplish corn-planting by means of a horse-power planter that will plant three rows at a time with ease, certainty, and facility, preparing the earth for the seed, dropping and covering it at one passage, the machine being constructed so as to conform to uneven surfaces by the three principal wheels working in adjustable bearings independently of each other, carrying upon the frame one man as driver and operator, by whom the dropping of seed is controlled and the forward part of the machine raised and lowered at will, by means of a windlass device, to facilitate turning at the ends of the rows, and also transportation from field to field.

I form my machine by making, first, a frame having two cross-bars, A, and three pairs of longitudinal bars, E, one pair at each end and one pair in the middle, said frame being about seven feet and six inches transversely, and four feet and four inches longitudinally.

Between each pair of cross-bars E is placed a wheel, B, about two feet six to nine inches in diameter. The journals or bearings of said wheels B work in pendants $l$, projecting downward twelve to fifteen inches below the frame, and in curved vertical slots $f$, so that they will move up or down each independent of the other, dropping into a dead furrow or hollow, thereby accommodating themselves to uneven surfaces. The surfaces or peripheries of the wheels B are to be made concave, about six to eight inches span, for the purpose of more effectually covering the seed. Upon each pair of longitudinal bars of the frame, and immediately forward of the wheels, are located seed-boxes $a$, with rotating bottoms $e$, with openings in the same, through which the seed passes. On the middle pair of said bars are two such boxes, $a$ $a'$, for two kinds of seed.

The bottoms of the seed-boxes are rotated by means of a horizontal bar, C, extending the whole length transversely of the frame A, with a spring, $k$, at each seed-box, which engages cogs on the ratchet-wheel $e$ on the edge of the bottom of the seed-boxes; and as the said horizontal bar is reciprocated by a lever, D, in the hands of the operator in a longitudinal direction, it revolves the bottoms of the seed-boxes until two of the openings in the bottoms being charged with seed are brought directly over cavities below, and one charge is held in a pocket at the top of the conductor $b$, while the other falls into the conductor $b$, which is to carry the seed to the earth.

The conductor $b$ is made to open by the same movement of the horizontal bar to receive the seed. The movement of said horizontal bar forward opens said conductor at the top and closes it at the bottom, and its backward movement opens the conductor at the lower extremity and allows the seed to pass to the earth; and the same movement opens the pocket and passes the charge out of the pocket, where it has been held into the conductor for the next hill.

The pumpkin-seed box or attachment $a'$, located at one side of the seed box $a$ upon the middle pair of longitudinal bars, is operated in the same manner and by the same movement as the other seed-boxes, only that it drops every alternate hill; its bottom revolving in the same way until one of its openings comes over the same conductor under the middle seed-box which carries the corn, and passes it to the earth with the corn and at the same time.

It will be seen that pumpkin-seeds are dropped in every third row only, and in every alternate hill in the row. Just forward of each wheel is a runner, $c$, branching at the rear end, the design of which is to make a slight furrow by parting the dry surface-soil, and the seed is deposited therein between the branch of the rear end of each runner in the furrow prepared for it. The concave face of the wheel B passes over and presses the fresh earth upon and around the seed.

It will be borne in mind that the conductor $b$ is adjusted so as to direct the seed between the rear branches of the runners. Said runners are held and forced along by braces $m$ running from the top of the frame, and also horizontal arms pivoted to the frame near the axle, and are self-adjusting, so that they will fall into depressions and rise over elevations, thereby conforming to the surface of the field; but in order that the runners shall not strike too deep, gage-wheels $n\ n$ are located on either side of each runner $c$, and, going forward of it, adjust the depth to which it shall run.

A windlass attachment, $h$, is provided on the forward end of the frame immediately over the runners, so that they can be raised from the ground when not working.

The machine is illustrated in detail by the drawings.

Figure 1 is a top view of the machine, showing the position of the seed-boxes upon the frame, the runners and their attachments being double, arms and braces to hold said runners with seed-conductors, and the adjustable concave wheels. Fig. 2 is a side view of the machine, showing the attachment of the runners by means of bars and braces, and also one of the wheels with pendants and curved vertical slots, within which the bearings work with a shoulder-axle. Fig. 3 is a sectional front view. Fig. 4 represents the rotating perforated bottom of seed-box $a$, showing ratchet and spring $j$. Fig. 5 represents the rotating bottoms of two seed-boxes, arranged side by side, with cogs meshing into each other for the purpose of a simultaneous movement of the bottoms. Fig. 6 is a side view of one of the conductors $b$, showing spring $k$, attached to rotating bottom E, and horizontal bar C.

I claim as my invention—

1. In combination with frame A E, in a horse-power corn-planter, the loose bearings working in slots in the pendants $e$, and pivoted rods $g$, to adapt the machine to uneven surfaces by the rising and falling of the wheels independently of each other, substantially in the manner described, as and for the purposes set forth.

2. In a horse-power corn-planter, substantially as described, the combination of the runners $c\ c\ c$ with double arms $o\ o\ o$, double braces $m\ m\ m$, double gage-wheels $n\ n\ n$, and windlass attachment, for the purpose of opening a furrow for the seed, all combined and constructed as described, and for the purposes set forth.

3. In a horse-power corn-planter, substantially as described, the combination of the seed-boxes $a\ a\ a$, with the revolving bottoms, provided with openings, the ratchet-wheels $e\ e\ e\ e$, springs $j\ j\ j$ and $k\ k\ k$, and conductors $b\ b\ b$ with the pockets and internal arrangements, as and for the purposes hereinbefore set forth.

ALBERT H. FESSENDEN.

Witnesses:
M. M. PHELPS,
JERRY C. BARNARD,
S. HENRY HUDSON.